(12) United States Patent
Karni et al.

(10) Patent No.: US 6,362,451 B1
(45) Date of Patent: Mar. 26, 2002

(54) DEVICE AND METHOD FOR LASER MARKING

(75) Inventors: Ziv Karni, Kfar Shmaryahu; Opher Kinrot, Rehovot, both of (IL)

(73) Assignee: Lumenis Ltd., Yokneam (IL)

( * ) Notice: Subject to any disclaimer, the term of this patent is extended or adjusted under 35 U.S.C. 154(b) by 0 days.

(21) Appl. No.: 09/214,921
(22) PCT Filed: Jul. 10, 1997
(86) PCT No.: PCT/IL97/00237
 § 371 Date: Dec. 3, 1999
 § 102(e) Date: Dec. 3, 1999
(87) PCT Pub. No.: WO98/02272
 PCT Pub. Date: Jan. 22, 1998

(30) Foreign Application Priority Data

Jul. 14, 1996 (IL) .................................................. 118850

(51) Int. Cl.⁷ ............................................... B23K 26/00
(52) U.S. Cl. .................................................. 219/121.68
(58) Field of Search ...................... 219/121.68, 121.69, 219/121.73, 121.8

(56) References Cited

U.S. PATENT DOCUMENTS

| | | | |
|---|---|---|---|
| 4,380,365 A | * | 4/1983 | Gross |
| 4,564,736 A | * | 1/1986 | Jones et al. |
| 4,785,456 A | * | 11/1988 | Kaplan |
| 4,844,574 A | * | 7/1989 | Chande .................... 219/121.6 |
| 4,985,780 A | * | 1/1991 | Garnier et al. .......... 219/121.68 |
| 5,125,922 A | * | 6/1992 | Dwyer et al. |
| 5,262,613 A | * | 11/1993 | Norris et al. ........... 219/121.68 |
| 5,298,717 A | * | 3/1994 | DeRossett, Jr. ........ 219/121.68 |
| 5,334,816 A | * | 8/1994 | Sugiyama .............. 219/121.83 |
| 5,409,376 A | * | 4/1995 | Murphy |

FOREIGN PATENT DOCUMENTS

| | | | | |
|---|---|---|---|---|
| DE | 3906336 A1 | * | 8/1990 | |
| FR | 2564349 | * | 11/1985 | |
| JP | 3-131005 | * | 6/1991 | ............ 219/121.68 |
| JP | 7-284965 | * | 10/1995 | |
| WO | 90/16099 | * | 12/1990 | |

* cited by examiner

Primary Examiner—Geoffrey S. Evans
(74) Attorney, Agent, or Firm—Eitan, Pearl, Latzer & Cohen-Zedek

(57) ABSTRACT

A portable laser marking device for permanently marking objects. The portable laser marking device has a control cabinet including a laser generating unit and an optical fiber that delivers the laser beam from the generating unit to a laser marking head. The laser marking head includes a focusing support with three prongs to keep the surface of the object at a focus distance from the marking head. A handle with marking on/off control is also attached to the laser marking head.

36 Claims, 2 Drawing Sheets

DEVICE AND METHOD FOR LASER MARKING

FIELD AND BACKGROUND OF THE INVENTION

The present invention relates in general to a device and method for laser marking. More particularly, the present invention relates to a portable laser marking device having a small marking head which is suitable for deep and permanent marking of hard-to-reach components of assembled products, items having variable sizes, items dispersed over a wide area and/or stationary items, which marking is both very difficult to alter, and if altered, the alteration is readily detected by a casual observer.

The need to mark objects ranges from the simple requirement such as (i) for putting a name tag on an object for recognition by its owner (e.g., a school bag for a child, or a garment sent for dry cleaning), (ii) for conveying certain information to a user of the object (e.g., expiration date on a manufactured food item), and (iii) for marking an object for future identification (e.g., in case of theft) or authentication (e.g., in case of art items).

Many methods for marking objects presently exist, the most common being printing the information either directly on the object, or on a separate sticker which is thereafter attached to the object. In many cases this level of marking is satisfactory, either because the duration of time the marking is expected to survive is limited, such as in the case of short lived shelf items, or in cases where there is no significant risk involved if the marking is altered.

However, other situations exist, where permanent marking is necessary, such that it is both very difficult to alter the marking, and if such an alteration is attempted, it may be readily detected by a casual observer.

It is clear that a detachable sticker cannot serve the purpose of a permanent marking means, as it can be removed, or replaced by another sticker. Even if the removal and replacement of the sticker can eventually be traced and detected in a laboratory, the purpose of immediate detection by an observer is not fulfilled.

Theft of motor vehicles is a well known problem all over the world. The standard way to combat theft is by making it difficult to start and move a parked vehicle by a variety of active and passive protection schemes, and indeed many such schemes are presently marketed globe wise. The usefulness of these schemes, however, is limited, and even though the vast majority of vehicles are protected, the epidemic of vehicle theft is ongoing and increasing. The stolen vehicles are used for joyrides and/or resale, but mostly for the stripping of parts for resale of the stripped parts. The stolen vehicles are therefore disassembled, and the parts are resold as spare parts.

Law enforcing agencies find it difficult to stop this trade in stolen property, as it is virtually impossible to prove that a certain spare part (e.g., a vehicle door) was stolen from a specific vehicle, and therefore it is very difficult to convict the thief, the merchant or the user of the stolen goods.

Engine blocks, chassis, and possibly other components may be marked by the original producer, but these markings are located in difficult places, and may not be directly related to the declared identity of the vehicle (referred hereinafter as the vehicle identification code, typically the vehicle identification number (VIN) and/or its license plate number), and are therefore not very useful for immediate identification of stolen property in the field.

Few years back a sand-blasting based marking method was developed and employed for marking a vehicle identification code on various parts thereof. Nevertheless, this method failed as an anti-theft approach, since as far as metal surfaces are of concern, sand blasting is limited to highly superficial marking which can be easily disguised by simple procedures (e.g., repainting the surface, etc.).

Laser systems are known for quite a while and are used in many fields such as but not limited the field of medicine, weapon systems, detection systems, etc. Laser systems are also used for marking various information on objects. Presently used laser marking systems are based on a relatively large stationary chassis, where the marking head is fixed in space and the objects to be laser marked are fed (manually or automatically) into the laser system. The marking is usually done on a single plane and the entire object to be marked enters the system, thus limiting laser marking to small size objects.

Such a prior art laser system 10 is depicted in FIG. 1 and typically includes (i) a control cabinet 12, which houses the laser power supply and a computer, and is connected to an external water system; (ii) a laser head 14, which is connected to control cabinet 12 by electrical and internal water cooling lines, indicated by 16; and (iii) a marking head 18, typically formed as an integral part and in continuation to laser head 12, from which marking head 18 a laser beam 20 emits.

The operation of system 10 is as follows. Laser head 12 and marking head 18 are stationary placed above a marked field in which an object 22 to be marked is placed.

Two alternative methods are used for marking, both methods employ a two dimensional displacement system to generate a relative displacement between laser beam 20 and object 22, to enable obtainment of two dimensional laser marks.

According to the first method, object 22 is placed on a conveyor 24 which displaces object 22 along a first Cartesian displacement mode, say X, as indicated by arrows 26 and 28, whereas marking head 18 is capable of changing the direction of beam 20 such that beam 20 may follow a second Cartesian displacement mode, say Y, as indicated by arrows 30 and 32. Thus, as conveyor 24 displaces object 22 along displacement mode X, beam 20 is displaced at displacement mode Y and a two dimensional mark is formed on object 22. The first method is suitable for marking products on manufacturing lines such as last marketing date on food items and expiration date on medicines.

According to the second method, object 22 is stationary placed relative to marking head 18. In this case marking head 18 is capable of changing the direction of beam 20 along both the first (X) and the second (Y) Cartesian displacement modes to form a two dimensional mark on object 22. The second method is suitable for marking items which are not manufactured in lines.

According to both methods, the relative displacement along the first and second Cartesian displacement modes between beam 20 and object 22 is under the control of the computer housed in control cabinet 12.

Nevertheless the prior art marking systems suffer limitations rendering them not suitable for some marking purposes. First, such systems require an external water cooling system, employ large laser heads which require stationary support and are therefore robust and non-portable. Typical dimensions of such systems (in mm) are indicated in FIG. 1. Second, as a result of the robustness and non-portability of the systems, such systems are not suitable for marking hard-to-reach components of assembled products such as vehicle parts, items which have varying sizes, items dispersed over a wide area and/or stationary items.

There is thus a widely recognized need for, and it would be highly advantageous to have, a portable laser marking system having a small marking head which is suitable for deep and permanent marking of hard-to-reach components of assembled products, items having variable sizes, items dispersed over a wide area and/or stationary items, which marking is both very difficult to alter, and if altered, the alteration is readily detected by a casual observer.

SUMMARY OF THE INVENTION

According to the present invention there is provided a portable device and method for deep and permanent laser marking of hard-to-reach components of assembled products, items having variable sizes, items dispersed over a wide area and/or stationary items, which marking is both very difficult to alter, and if altered the alteration is readily detected by a casual observer.

According to further features in preferred embodiments of the invention described below, the laser marking device comprising (a) a control cabinet including a built-in laser generating unit; (b) a marking head formed as a portable unit for marking the object with the laser mark; and (c) a flexible laser delivery system optically connecting said laser generating unit and said marking head.

According to still further features in the described preferred embodiments provided is a laser marking head for permanently marking a laser mark on an object, the marking head comprising (a) a two dimensional laser scanning system; (b) a collimating optical system for collimating a laser output of a laser delivery system and directing the laser output at the two dimensional laser scanning system; (c) a focusing system for receiving the laser output from the two dimensional laser scanning system and focusing the output onto the object; and (d) a focusing support for keeping the object at a focus distance from the marking head. According to still further features in the described preferred embodiments the control cabinet is portable.

According to still further features in the described preferred embodiments the device further comprising a computer system for controlling marking of the object.

According to still further features in the described preferred embodiments the built-in laser generating unit is air-cooled.

According to still further features in the described preferred embodiments the built-in laser generating unit generates Q-switched laser pulses generated by a I flash lamp or a diode pumped laser.

According to still further features in the described preferred embodiments the flexible laser delivery system is selected from the group consisting of an articulated Irm (e.g., seven knee type arm) and an optical fiber.

According to still further features in the described preferred embodiments the optical fiber has a low numerical aperture.

According to still further features in the described preferred embodiments the optical fiber is all-silica fiber.

According to still further features in the described preferred embodiments the marking head includes a collimating optical system for collimating a laser output of the flexible laser delivery system.

According to still further features in the described preferred embodiments the marking head includes a two dimensional laser scanning system.

According to still further features in the described preferred embodiments the two dimensional laser scanning system includes a first and a second rotatable mirrors rotating about a first and a second axes, respectively.

According to still further features in the described preferred embodiments the first mirror is rotated via a first motor, whereas the second mirror is rotated via a second motor.

According to still further features in the described preferred embodiments the first and second motors are closed loop galvanometric motors.

According to still further features in the described preferred embodiments the marking head includes a focusing system.

According to still further features in the described preferred embodiments the focusing system is a focusing lens of an F-theta type, which serves at focusing the laser beam onto the marked object.

According to still further features in the described preferred embodiments the marking head includes a focusing support for keeping the surface of the marked object at a focus distance.

According to still further features in the described preferred embodiments the focusing support includes at least three prongs.

According to still further features in the described preferred embodiments the device further comprising at least three sensors (e.g., microswitches) serving as interlocks to ensure operation only when the marking head is held in place and at a correct focus distance from the marked object.

According to still further features in the described preferred embodiments the marking head includes a handle equipped with a marking on/off control device.

According to still further features in the described preferred embodiments provided is a method of laser marking an object comprising the steps of (a) predefining at least one position on the object; (b) using a laser marking device for marking a laser mark of a predefined design onto the object, the laser mark including a positive identification information related to the object (such as the vehicle identification code when the object is a vehicle, etc.), the laser mark being of such depth and clarity such that an attempt to alter (e.g., remove, change, damage and/or cover) the mark is detectable by an observer.

According to still further features in the described preferred embodiments the method further comprising the step of (c) identifying the object as laser protected.

According to still further features in the described preferred embodiments the object is a component of a vehicle and the design is the vehicle identification code (e.g., the vehicle identification number and/or the license plate number of the vehicle).

According to still further features in the described preferred embodiments provided is a method of laser marking a vehicle for anti-theft purposes comprising the steps of (a) pre-defining at least one position on the vehicle; (b) using a laser marking device for marking a laser mark including the vehicle identification code onto the vehicle, the laser mark being of such depth and clarity such that an attempt to alter (e.g., remove, change, damage and/or cover) the mark is detectable by an observer.

According to still further features in the described preferred embodiments the method further comprising the step of (c) identifying the vehicle as laser protected.

The present invention successfully addresses the shortcomings of the presently known configurations by providing a portable laser marking system having a small marking head which is suitable for deep and permanent marking of hard-to-reach components of assembled products, items having variable sizes, items dispersed over a wide area and/or stationary items, which marking is both very difficult to alter, and if altered is readily detected by a casual observer.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a portable laser marking system having a small marking head which can be used for permanent marking of hard-to-reach components of assembled products, items having variable sizes, items dispersed over a wide area and/or stationary items. Specifically, the present invention can be used for marking vehicle components for anti-theft purposes. Marking according to the present invention is both very difficult to alter (e.g., remove, change, damage and/or cover), and if altered is readily detected by a casual observer.

The principles and operation of a laser marking system according to the present invention may be better understood with reference to the drawings and accompanying descriptions.

Figure 2:
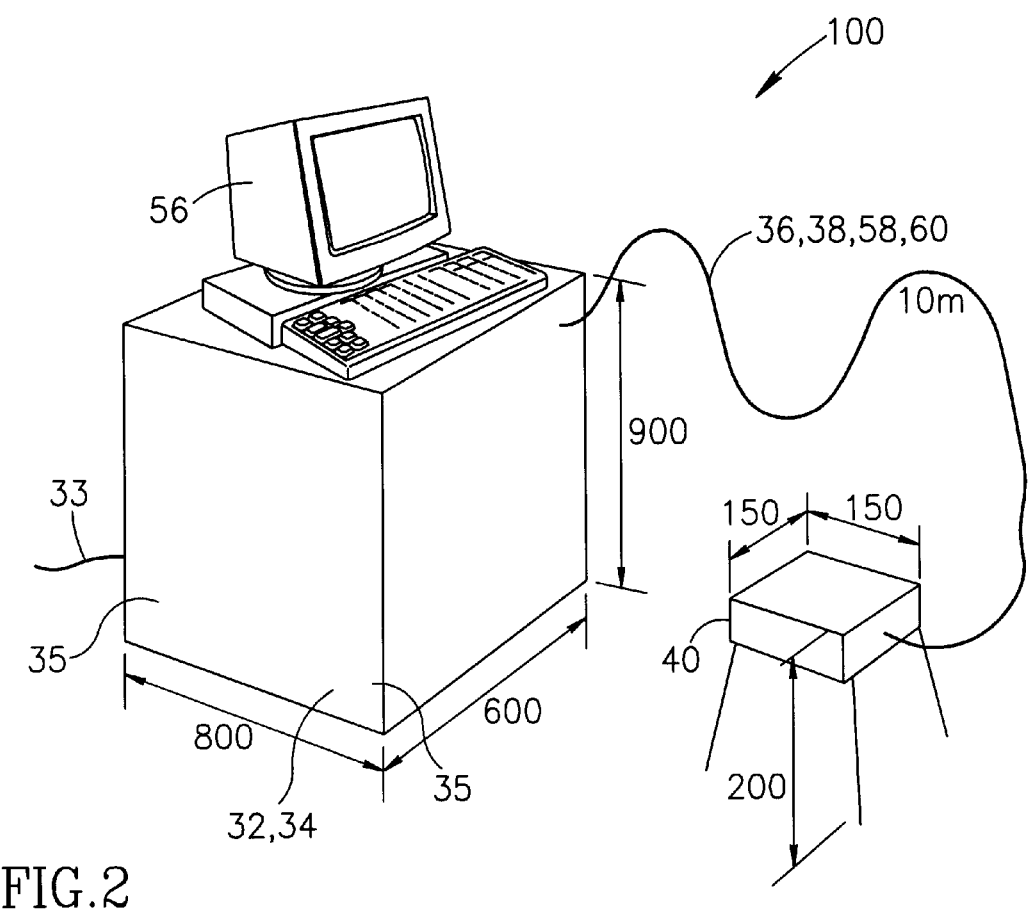
FIG. 2 is a perspective view of a laser marking device according to the present invention.

Referring now to the drawings, FIG. 2 illustrates the laser marking device of the present invention, referred to hereinbelow as device 30. Thus, device 30 includes a control cabinet 32 with a built-in laser generating unit (i.e., a laser head) 34. Control cabinet 32 preferably includes wheels 35, is preferably air-cooled (as opposed to water cooled) and is thus portable. Laser head 34 generates Q-switched laser pulses, and is either flash lamp or diode pumped solid state laser (i.e., having a wavelength of 0.51–1.1 $\mu$m, capacity of 20–200 Watt, pulse duration of 10–150 nsec and energy of 1–20 mJ/pulse). Alternatively, yet at present less preferably, laser head 34 can be a gas (e.g., $CO_2$ laser) or liquid (e.g., a dye laser) based laser head that generates laser pulses of otherwise similar qualities. In order for device 30 according to the present invention to be effectively air-cooled, laser generating unit 34 of device 30 is principally under a "stand-by" operation mode and turns into a full power operation device 30 as further described hereinbelow. Control cabinet 32 is connected via, a cable 33 to a power source, e.g., a 220/380 Volt power supply (not shown).

Device 30 further includes a flexible laser delivery system 36. In a preferred embodiment, laser delivery system is an optical fiber 38, yet, as well known in the art, flexible laser delivery system 36 may alternatively be in the form of an articulated arm equipped with a mirror in each articulation (not shown), e.g., a seven knee type arm, as well known in the art. Optical fiber 38 is preferably a low numerical aperture (e.g., N.A.$\leq$0.11) all-silica fiber having a core diameter of 30–200 $\mu$m.

Device 30 further includes a marking head 40. Marking head 40 is separated from laser head 34, both are optically connected via flexible laser delivery system 36. Thus constructing device 30 ensures its small dimensions indicated in mm in FIG. 2, and thus its portability.

Figure 1:
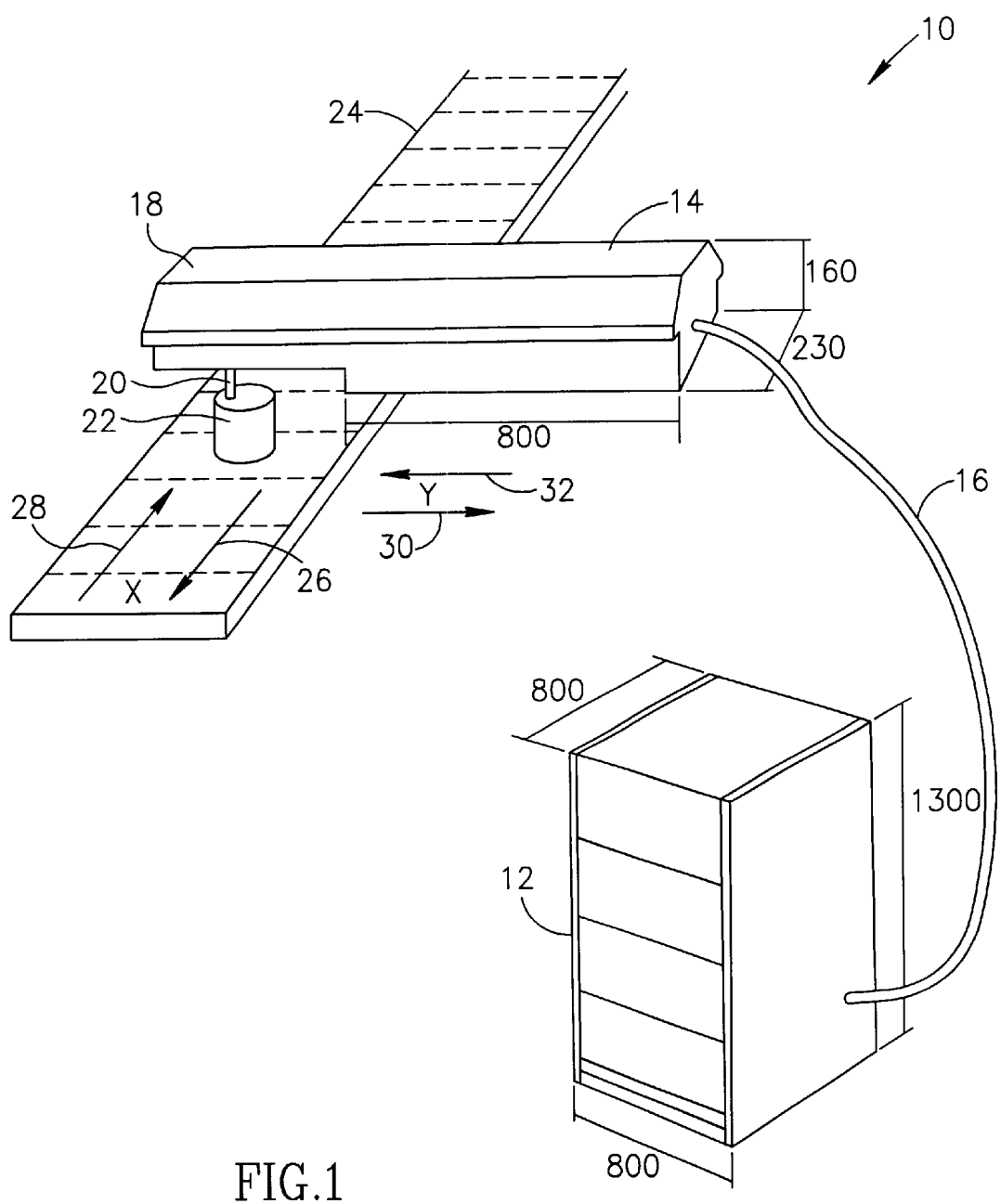
FIG. 1 is a perspective view of a prior art laser marking system.

In addition, as marking head 40 is not integrally formed in continuation with laser head 34, as is the case in prior art laser marking systems such as that shown in FIG. 1, and is connected to laser head 34 via flexible laser delivery system 36, marking head 40 is small, light (e.g., one kg), handy and highly portable relative to device 30 as a whole.

Figure 3:
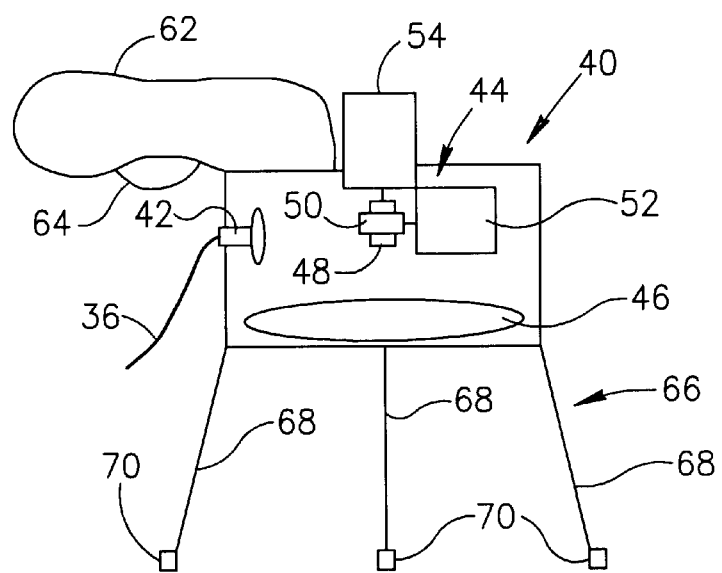
FIG. 3 is a schematic depiction of a marking head disposed in the laser marking system according to the present invention, the marking head includes a focusing support.

With reference now to FIGS. 2 and 3. FIG. 3 presents a schematic depiction of marking head 40 of device 30. Thus, marking head 40 includes a collimating optical system 42 for collimating the laser output of flexible laser delivery system 36 onto a two dimensional laser scanning system 44 and a focusing system 46.

Collimating optical system 42 is characterized by a substantially parallel output beam. When using an optical fiber based laser delivery system the preferred effective focal length of collimating optical system 42 is 20–100 mm, whereas when using an articulated arm based laser delivery system, collimating optical system 42 accepts an almost parallel beam input. Focusing system 46 is preferably a focusing lens of an F-theta type (preferred focal length 50–250 mm), which serves at focusing the laser beam onto an object being marked.

According to a preferred embodiment, laser scanning system 44 includes a first 48 and a second 50 rotatable mirrors, preferably the axis of rotation of each of which is substantially orthogonal to the axis of rotation of the other mirror, such that a two dimensional scanning pattern is achieved, yet other orientation are also possible, as well known in the art.

In a preferred embodiment, first mirror 48 is rotated via a first closed loop galvanometric motor 52, whereas second mirror 50 is rotated via a second closed loop galvanometric motor 54. Yet, as well known in the art, other types of motors are also suitable for this purpose.

In a preferred embodiment the rotation of both mirrors 48 and 50 is under the control of a computer system 56, shown in FIG. 2, which is connected via a command line 58, preferably disposed along flexible laser delivery system 36, to motors 52 and 54. A power line 60 for operating motors 52 and 54 is preferably also disposed along flexible laser delivery system 36.

In a preferred embodiment marking head 40 includes a focusing support 56 for keeping the surface of the marked object at the focus distance from focusing system 46. Support 56 preferably includes at least three prongs 58 directed at maintaining the laser beam focused also when slightly curved surface of an object is marked.

At their far end, each of prongs 58 is preferably equipped with a sensor (e.g., a microswitch) 60. Sensors 60 serve as interlocks to ensure that a user of device 30 can activate its operation only when marking head 40 in held firmly in place and at the correct focus distance from the marked surface. Activating/deactivating the operation of device 30 can be achieved either by controlling the generation (i.e., emission) of the laser beam or by controlling a shutter (not shown) that is capable of blocking the laser beam, all as is well known in the art.

In a preferred embodiment marking head 40 further includes a handle 62 equipped with a marking on/off control device 64.

The combination of Q-switched laser, low numerical aperture optical fiber 38, collimating optical system 42 and focusing system 46 ensures high average power and high power density at the marked surface (e.g., 0.1–10 GW/cm² at 1–10 kHz repetition rate for marking a metal surface; lower power densities for softer materials).

The operation of laser marking device 30 is as follows. A user holds marking head 40 via handle 62, places marking head 40 on the surface of the object to be laser marked and ensures that each of sensors 60 is in contact with the surface. As each of sensors 60 is in contact with the surface of the marked object they are unlocked and permit the operation of device 30. Then, the user presses marking on/off control device 64 to operate device 30. As a result, a laser scan according to predetermined pattern such as a vehicle identification code (e.g., the vehicle identification number and/or the license plate number of the vehicle), a logo of a firm, etc., is performed, resulting in a deep and thus permanent laser mark applied onto the object. It should be noted that any numbers and/or letters combination may additionally or alternatively be laser marked onto an object using device 30 in the form of a bar-code (linear or concentric bar-code) or any other symbol system suitable for automatic inspection and interpretation.

Device 30 may be used for various purposes including but not limited to marking a vehicle identification code (e.g., the vehicle identification number and/or the license plate number) on vehicle components.

According to the present invention also provided is a method of laser marking objects, which method is characterized by (i) a permanent marking which is difficult to alter (e.g., damage, change, remove and/or cover); (ii) the marking is of a positive identification information directly related to the object (e.g., or its owner); (iii) marking at a predefined position, such that an observer knows whether the object is marked; (iv) marking of such depth and clarity such that any alteration attempt is immediately visible by a casual observer (no need for a laboratory examination); and (v) possibility for computerized logging of the marking, allowing the maintenance of a data bank on all related markings.

Reference is now made to the following examples, which together with the above descriptions, illustrate the invention.

EXAMPLE 1

Marking Vehicle Components

The vehicle identification code (e.g., the vehicle identification number and/or the license plate number) of any vehicle is a very specific identification sign of the vehicle, easily read by any observer (e.g., a policeman, a border patrol, etc.), and does not require the consultation of detailed computer lists to match the marking to the vehicle. According to the method of the present invention, specific places in each vehicle are defined (e.g., 15 cm under the top of the left door, or 10 cm from the center front edge of the engine cover), to permanently laser mark the vehicle identification code at all these spots, including metal, plastic and other parts, and to identify the vehicle as "laser protected" (e.g., or any other trade name for this protection scheme). The thieves can of course eliminate the marking, but not without leaving a clear sign of their doing so (if the laser marking is applied deep into the metal, they can cut the metal off, but the observer can then look for the marked spot at a very specific place, and is able to identify that alterations were attempted).

In practice, the device according to the present invention may be manually fed with the car details in an office, wherein a stationary computer is connected to the inventive device, the computer communicating with the device via suitable communication means (e.g., a data line), all as is well known in the art. Alternatively, if marking is of the vehicle's license plate number, the data may be automatically fed into the computer using a suitable camera (e.g., a CCD camera).

It should be noted that when the term 'deep' marking is used herein in this document and especially in the claims section below, it refers to a marking that cannot be easily covered by for example a coat such as paint. Thus, if a metal made vehicle is concerned, deep marking of the vehicle's metal parts, which are typically 600 μm thick, refers to a marking which cannot be coated off by a paint having a typical thickness of 100 μm. A suitable deep marking in this case would be for example deeper than 200 μm, preferably in the range of 300–600 μm. When other materials such as plastic, glass, paper, and the like substances are concerned, deep marking would be a marking that is not easily coated by a suitable (e.g., conventional) coating material used to coat the substance of choice.

The novelty of the method according to the present invention is in the permanent nature of the laser marking, the notion of marking at specific spots, and the 'advertising' (e.g., by a sticker, or by notifying all law enforcing agencies) that such marking has been applied. Eventually, such markings may become mandatory in a certain country, in which case all vehicles will bear the laser markings, and vehicle theft will be much reduced.

While the invention has been described with respect to a limited number of embodiments, it will be appreciated that many variations, modifications and other applications of the invention may be made.

What is claimed is:

1. A portable laser marking device for permanently marking a laser mark on an object, the device comprising:
    (a) a control cabinet including a built-in laser generating unit for generating a laser beam;
    (b) a marking head formed as a portable unit for marking the object with the laser mark, said marking head including a focusing support for keeping the surface of the marked object at a focus distance, said marking head further including a handle being equipped with a marking on/off control device; and
    (c) a flexible laser delivery system optically connecting said laser generating unit and said marking head.

2. A laser marking device as in claim 1, wherein said control cabinet is portable.

3. A laser marking device as in claim 1, further comprising a computer system for controlling marking of the object.

4. A laser marking device as in claim 1, wherein said built-in laser generating unit is air-cooled.

5. A laser marking device as in claim 1, wherein said built-in laser generating unit generates Q-switched laser pulses.

6. A laser marking device as in claim 5, wherein said Q-switched laser pulses are generated by a flash lamp pumped laser.

7. A laser marking device as in claim 5, wherein said Q-switched laser pulses are generated by a diode pumped laser.

8. A laser marking device as in claim 1, wherein said flexible laser delivery system is selected from the group consisting an articulated arm and an optical fiber.

9. A laser marking device as in claim 8, wherein said optical fiber has a low numerical aperture.

10. A laser marking device as in claim 8, wherein said optical fiber is all-silica fiber.

11. A laser marking device as in claim 1, wherein said marking head includes a collimating optical system for collimating a laser output of said flexible laser delivery system.

12. A laser marking device as in claim 1, wherein said marking head includes a two dimensional laser scanning system.

13. A laser marking device as in claim 12, wherein said two dimensional laser scanning system includes a first rotatable mirror and a second rotatable mirror rotating about a first and a second axis respectively.

14. A laser marking device as in claim 13, wherein said first mirror is rotated via a first motor, whereas said second mirror is rotated via a second motor.

15. A laser marking device as in claim 14, wherein said first and second motors are closed loop galvanometric motors.

16. A laser marking device as in claim 1, wherein said marking head includes a focusing system.

17. A laser marking device as in claim 16, wherein said focusing system is a focusing F-theta lens, which serves at focusing the laser beam onto the marked object.

18. A laser marking device as in claim 1, wherein said focusing support includes at least three prongs.

19. A laser marking device as in claim 1, further comprising at least three sensors serving as interlocks to ensure operation only when said marking head is held in place and at a correct focus distance from the marked object.

20. A laser marking device as in claim 19, wherein said sensors are microswitches.

21. A laser marking device as in claim 1, wherein said laser mark is deep.

22. A laser marking head for permanently marking a laser mark on an object, the marking head comprising:
    (a) a two dimensional laser scanning system;
    (b) a collimating optical system for collimating a laser output of a laser delivery system and directing said laser output at said two dimensional laser scanning system;
    (c) a focusing system for receiving said laser output from said two dimensional laser scanning system and focusing said output onto the object; and
    (d) a focusing support for keeping the object at a focus distance from the marking head, said focusing support including at least three prongs.

23. A marking head as in claim 22, wherein said two dimensional laser scanning system includes a first rotatable mirror and a second rotatable mirror rotating about a first and a second axis, respectively.

24. A marking head as in claim 23, wherein said first mirror is rotated via a first motor, whereas said second mirror is rotated via a second motor.

25. A marking head as in claim 24, wherein said first and second motors are closed loop galvanometric motors.

26. A marking head as in claim 22, wherein said focusing system is a focusing F-theta lens, which serves at focusing the laser beam onto the marked object.

27. A marking head as in claim 22, further comprising at least three sensors serving as interlocks to ensure operation only when the marking head is held in place and at a correct focus distance from said object.

28. A marking head as in claim 27, wherein said sensors are microswitches.

29. A marking head as in claim 22, further comprising a handle, said handle includes a marking on/off control devise.

30. A laser marking head for permanently marking a laser mark on an object, the marking head comprising:
    (a) a two dimensional laser scanning system;
    (b) a collimating optical system for collimating laser output of a laser delivery system and directing said laser output at said two dimensional laser scanning system;
    (c) a focusing system for receiving said laser output from said two dimensional laser scanning system and focusing said output onto the object;
    (d) a focusing support for keeping the object at a focus distance from the marking head; and
    (e) a handle including a marking on/off control device.

31. A marking head as in claim 30, wherein said focusing support includes at least three prongs.

32. A marking head as in claim 31, further comprising at least three sensors serving as interlocks to ensure operation beam only when the marking head is held in place and at a correct focus distance from said object.

33. A marking head as in claim 31, wherein said two dimensional laser scanning system includes a first rotatable mirror and a second rotatable mirror rotating about a first and a second axis, respectively.

34. A marking head as in claim 33, wherein said first mirror is rotated via a first motor, whereas said second mirror s rotated via a second motor.

35. A marking head as in claim 34, wherein said first and second motors are closed loop galvanometric motors.

36. A marking head as in claim 30, wherein said focusing system is a focusing F-theta lens, which serves at focusing the laser beam onto the marked object.

* * * * *